US010000851B2

United States Patent
Amini et al.

(10) Patent No.: US 10,000,851 B2
(45) Date of Patent: *Jun. 19, 2018

(54) COLD SPRAY MANUFACTURING OF MAXMET COMPOSITES

(71) Applicant: UNITED TECHNOLOGIES CORPORATION, Hartford, CT (US)

(72) Inventors: Shahram Amini, Berwyn, PA (US); Christopher W Strock, Kennebunk, ME (US); John A Sharon, Manchester, CT (US); Michael A Klecka, Coventry, CT (US); Aaron T Nardi, East Granby, CT (US)

(73) Assignee: United Technologies Corporation, Farmington, CT (US)

( * ) Notice: Subject to any disclaimer, the term of this patent is extended or adjusted under 35 U.S.C. 154(b) by 521 days.

This patent is subject to a terminal disclaimer.

(21) Appl. No.: 14/887,612

(22) Filed: Oct. 20, 2015

(65) Prior Publication Data

US 2016/0230288 A1    Aug. 11, 2016

Related U.S. Application Data

(60) Provisional application No. 62/066,504, filed on Oct. 21, 2014, provisional application No. 62/083,486, filed on Nov. 24, 2014.

(51) Int. Cl.
C23C 24/04 (2006.01)
B22F 1/02 (2006.01)
(Continued)

(52) U.S. Cl.
CPC ............ C23C 24/04 (2013.01); B22F 1/025 (2013.01); B22F 7/008 (2013.01); F01D 5/288 (2013.01);
(Continued)

(58) Field of Classification Search
CPC .......... C23C 24/04; B22F 1/025; B22F 7/008; B22F 7/02; B22F 2301/052;
(Continued)

(56) References Cited

U.S. PATENT DOCUMENTS

| 2008/0081172 A1* | 4/2008 | Strock | C23C 4/02 |
| | | | 428/304.4 |
| 2010/0178169 A1* | 7/2010 | Webb | F01D 5/087 |
| | | | 416/95 |
| 2014/0126683 A1 | 5/2014 | Mazzoccoli et al. | |

FOREIGN PATENT DOCUMENTS

| EP | 1705266 A2 | 9/2006 |
| EP | 2578804 A1 | 4/2013 |

(Continued)

OTHER PUBLICATIONS

Raletz F, Vardelle M, Ezoo G (2006) Critical particle velocity under cold spray conditions. Surf Coat Technol 201(5):1942-1947.*
Champagne, V.K., et al. "15. Cold Spray Coatings to Improve the Corrosion Resistance of Magnesium (Mg) Alloys." Corrosion Prevention of Magnesium Alloys, Elsevier Inc., 2013.*
H. Gutzmann et al.; Cold Spraying of Ti2AlC Max-Phase Coatings; Journal of Thermal Spray Technology; Nov. 10, 2012; JTTEE5; DOI:10.1007/s11666-012-9843-1; 1059-9630; ASM International.
S. Rech et al.; Cold-Spray Deposition of Ti2AlC Coatings; 2013, Vacuum, (94), 69-73. http://dx.doi.org/10.1016/j.vacuum.2013.01.023; Elsevier; Accepted Manuscript.

Primary Examiner — Colleen P Dunn
Assistant Examiner — Anthony M Liang
(74) Attorney, Agent, or Firm — Bachman & LaPointe, P.C.

(57) ABSTRACT

A process of forming a MAXMET composite coating or component on an article, that in the case of components can be removed, comprising providing an article having a substrate. The process includes providing at least one powder containing the MAXMET composite, wherein the MAXMET composite comprises a mixture of MAX phase particles and metal. Cold spraying the at least one powder on the substrate at a critical velocity. Forming a layer of the MAXMET composite on the substrate.

14 Claims, 3 Drawing Sheets

(51) Int. Cl.
*B22F 7/00* (2006.01)
*F01D 5/28* (2006.01)
*F16C 33/04* (2006.01)

(52) U.S. Cl.
CPC ..... *B22F 2301/052* (2013.01); *B22F 2301/15* (2013.01); *B22F 2302/10* (2013.01); *F05D 2300/6032* (2013.01); *F16C 33/043* (2013.01); *F23R 2900/00018* (2013.01)

(58) Field of Classification Search
CPC .............. B22F 2301/15; B22F 2302/10; B22F 2302/15; B22F 2302/20; F01D 5/288; F05D 2300/6032
See application file for complete search history.

(56) References Cited

FOREIGN PATENT DOCUMENTS

| | | |
|---|---|---|
| WO | 2006109956 A1 | 10/2006 |
| WO | 2014025573 A1 | 2/2014 |
| WO | 2014149097 A2 | 9/2014 |
| WO | 2015112662 A1 | 7/2015 |

* cited by examiner

COLD SPRAY MANUFACTURING OF MAXMET COMPOSITES

CROSS REFERENCE TO RELATED APPLICATIONS

This application claims the benefit of provisional application Ser. No. 62/066,504, filed Oct. 21, 2014 and provisional application Ser. No. 62/083,486, filed on Nov. 24, 2014.

BACKGROUND

The disclosure relates to MAXMET materials used for cold sprayed coatings.

MAXMETs are a class of metal matrix composites reinforced with MAX phases. MAX phases are a family of 60+ compounds with an unusual and sometimes unique combination of properties combining properties of ceramics and metals. MAXMETs offer excellent mechanical properties and improved toughness, high damage tolerance, high thermal stability, and improved erosion resistance. They also exhibit fully reversible non-linear elastic hysteresis behavior during cyclic deformation that results in ultrahigh damping capability in MAXMET composite.

The above mentioned attributes render MAXMETs suitable candidates for abradable coatings, dampeners, and bushing materials. However, for high temperature applications, thermodynamic stability of MAX phases, or lack thereof, when in contact with high melting point matrices at or above their melting point temperature, potentially may pose limitations for manufacturing via melt infiltration, powder processing or thermal spraying routes where high processing temperatures are required.

Therefore, there is a need for lower temperature processing of MAXMETs to ensure the MAX phase reinforcement remains thermodynamically stable and retains its composition.

Specifically, for the manufacture of MAXMET coatings via thermal spraying routes, there are multiple manufacturing steps involved. For example, spray drying of "MAX" phase powder with "metal" powder prior to thermal spraying. This step in manufacturing is costly, and sometimes has low yield. Therefore, there is a need for lower cost higher yield manufacturing routes to process "MAXMET" composites.

SUMMARY

In accordance with the present disclosure, there is provided a process of forming a MAXMET composite coating on an article. The process includes providing an article having a substrate, and providing at least one powder containing the MAXMET composite, wherein the MAXMET composite comprises a mixture of MAX phase particles and metal. Cold spraying the at least one powder on the substrate at a critical velocity. Forming a layer of the MAXMET composite on the substrate.

In another and alternative embodiment the cold spraying includes using a carrier gas selected from the group consisting of nitrogen, air and helium.

In another and alternative embodiment the metallic shell comprises Al or the metallic shell comprises Ni and in other embodiments the metallic shell comprises other metals and alloys such as Co, Cr, Ti and Cu.

In another and alternative embodiment the article is selected from the group consisting of a dampener, a bushing, an air seal, a combustor component, and an airfoil In another and alternative embodiment the MAX phase is defined by the formula $M_{n+1}AX_n$ where n is a number from 1 to 3.

In another and alternative embodiment a bond coat layer is adhered to at least a portion of the substrate. The MAXMET layer is adhered to the bond coat.

In another and alternative embodiment the process comprises forming at least one MAX phase particle; and coating the MAX phase particle with a metallic shell.

In another and alternate embodiment, the critical velocity is a function of the metal's specific gravity, specific heat, melting point, and ultimate stress as well as a spray temperature and a size distribution of the powder.

In another and alternative embodiment the layer of the MAXMET composite on the substrate has a thickness of from about 15 microns to about 5000 microns.

In another and alternative embodiment the MAXMET composite comprises a volume fraction mixture of from about 25% to about 50% MAX phase particles and from about 25% to about 50% metallic particles.

In another and alternative embodiment the MAXMET composite comprises a volume fraction mixture of 50% MAX phase particles and 50% metallic particles.

In another and alternative embodiment the method further comprises spraying a plurality of layers on the article. Forming a predefined structure from the plurality of layers of the MAXMET composite on the article removable from the article by a removal process, wherein the predefined structure is configured as a solid component.

In another and alternative embodiment the cold spraying further comprises supplying the MAXMET composite powder to a spray gun using a helium primary gas flow of from about 5 $m^3$/h to about 250 $m^3$/h, said powder carrier gas flow rate exiting the spray gun of 2 $m^3$/h to 12 $m^3$/h, wherein the powder is fed along with the primary gas flow, a powder feed rate to the spray gun of 1 to 20 grams/min., and a gun distance from a surface of the substrate being coated of from 0.25 to 5.0 inches.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
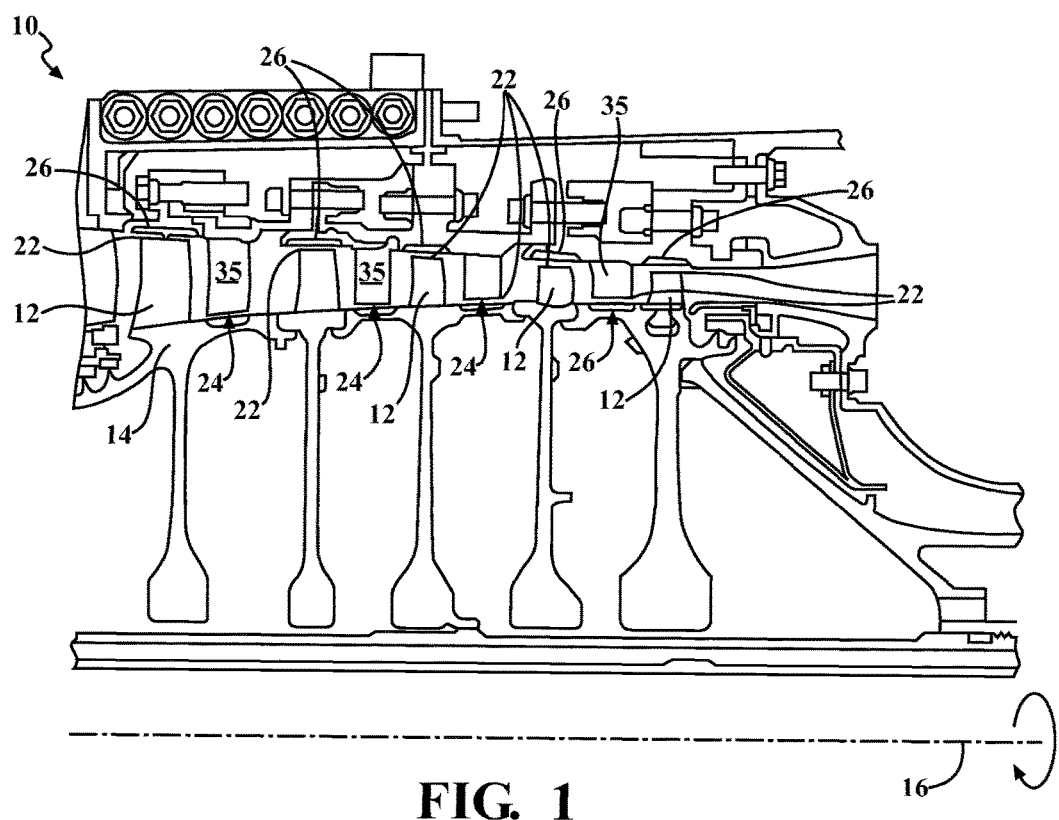
FIG. 1 shows a perspective view of a portion of a gas turbine engine incorporating an air seal.

FIG. 1 shows a portion of a gas turbine engine 10, for example, a high pressure compressor section. The engine 10 has blades 12 that are attached to a hub 14 that rotate about an axis 16. Stationary vanes 18 extend from an outer case or housing 20, which may be constructed from a nickel alloy, and are circumferentially interspersed between the turbine blades 15, which may be constructed from titanium in one example. A first gap 22 exists between the blades 12 and the outer case 20, and a second gap 24 exists between the vanes 18 and the hub 14.

Figure 2:
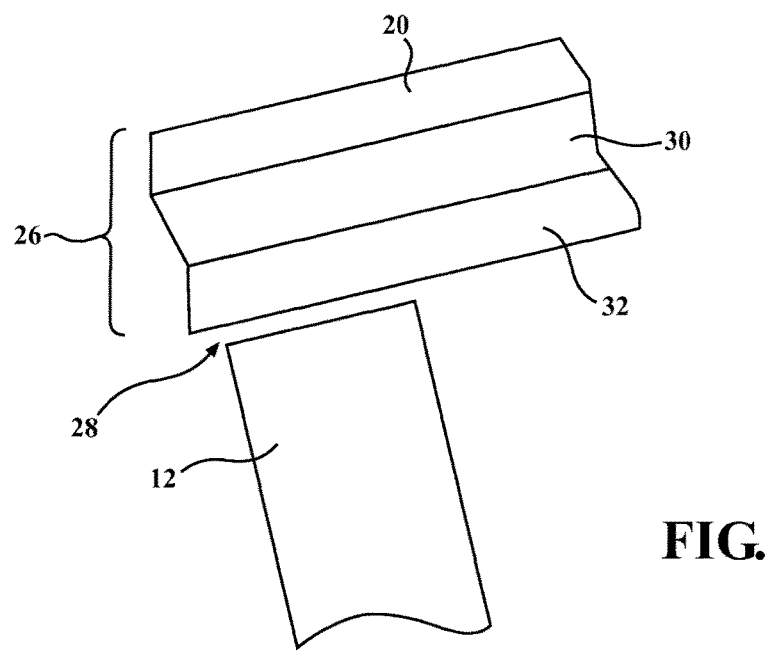
FIG. 2 shows a schematic view of an air seal.

Air seals (i.e., article) 26 (FIG. 2) are positioned in at least one of the first and second gaps 22, 24. Further, the air seals 26 may be positioned on: (a) the outer edge of the blades 12; (b) the inner edge of the vanes 18; (c) an outer surface of the hub 14 opposite the vanes 18; and/or (d) as shown in FIG. 2, on the inner surface of outer case 20 opposite the blades 12. It is desirable that the gaps 22, 24 be minimized and interaction between the blades 12, vanes 18 and seals 26 occur to minimize air flow around blade tips or vane tips.

In one example shown in FIG. 2, the air seal is integral with and supported by a substrate, in the example, the outer case 20. That is, the air seal 26 is deposited directly onto the outer case 20 without any intervening, separately supported seal structure, such as a typical blade outer air seal. The tip of the blade 28 is arranged in close, proximity to the air seal 26. It should be recognized that the seal provided herein may be used in any of a compressor, a fan or a turbine section and that the seal may be provided on rotating or non-rotating structure.

The air seal 26 includes a bond coat 30 deposited onto the outer case 20 or other structure/substrate. In an exemplary embodiment, the bond coat 30 may be a thermally sprayed bond coat. In another example, the bond coat 30 may comprise an alloy, such as a MCrAlY composition applied by air plasma spray. A composite topcoat 32 acts as an abradable layer that is deposited on the bond coat 30 opposite the outer case 20. In an exemplary embodiment, the metallic bond coat 30 may be replaced by an adhesive layer. The adhesive may be polyurethane in the front stages of the compressor or in the fan where ambient temperature is sufficiently low (e.g., less than about 300 degrees Fahrenheit.

Figure 3:
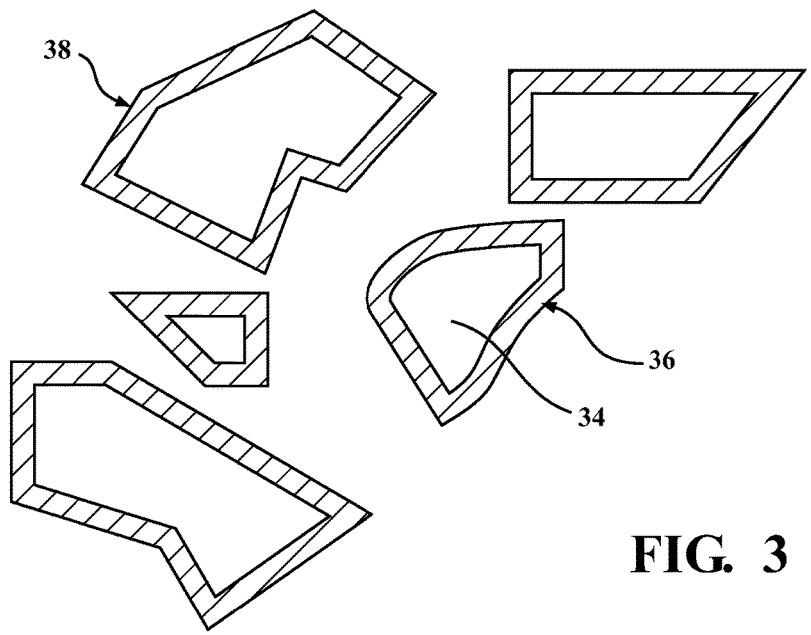
FIG. 3 shows a cross sectional view of a coated MAX phase powder particle before being applied.
Figure 4:
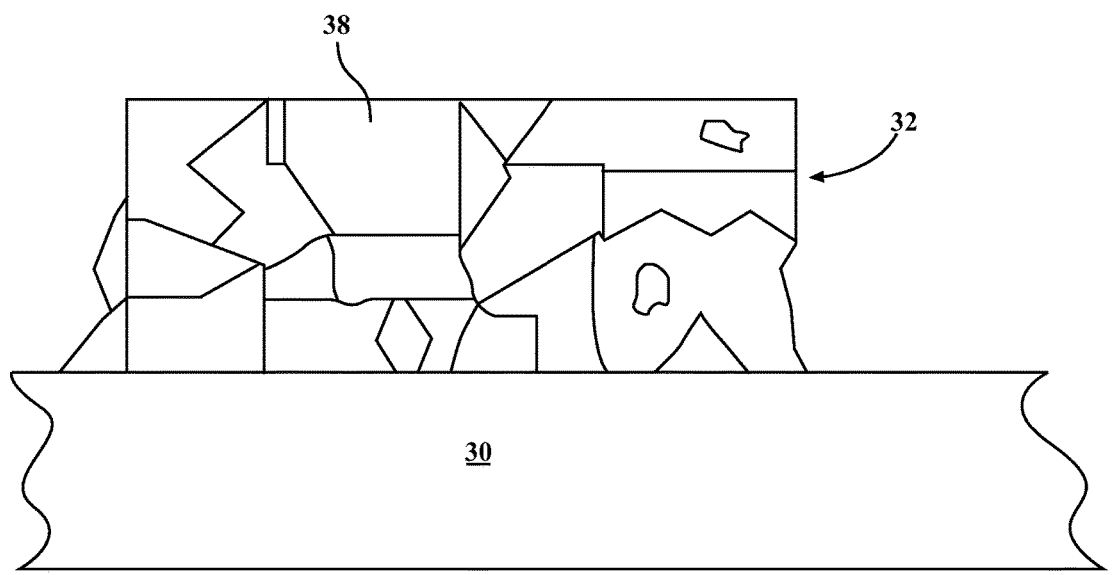
FIG. 4 shows a MAXMET composite abradable coating on a substrate.
Figure 5:
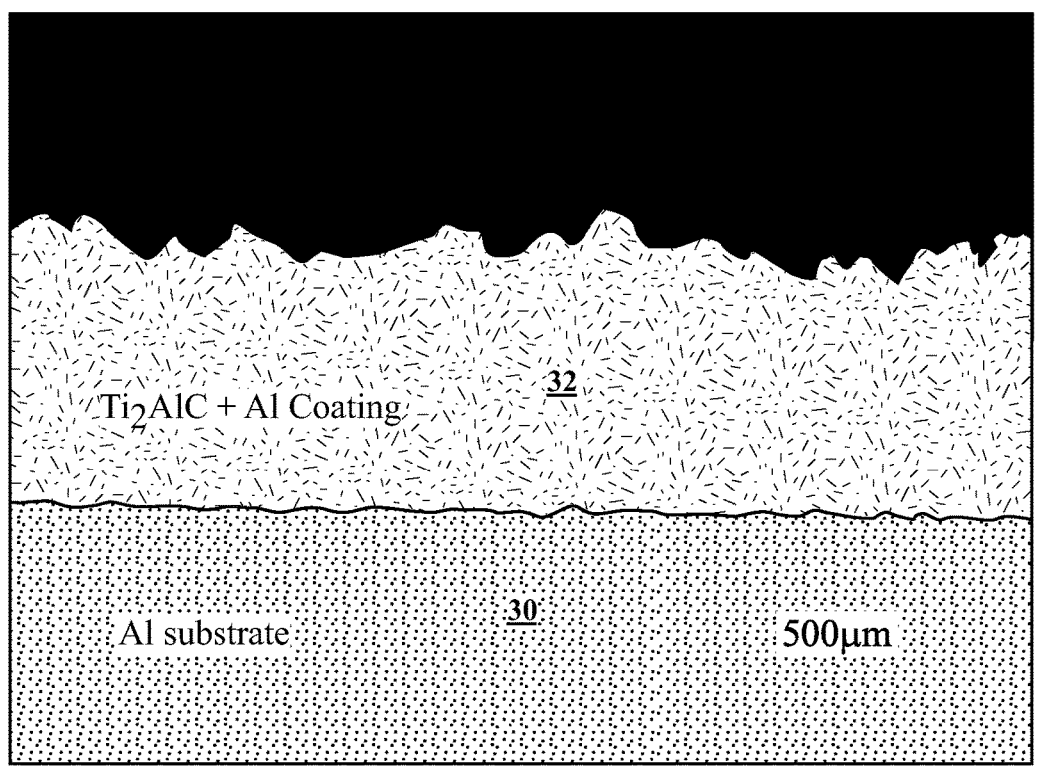
FIG. 5 is a photomicrograph showing a coating system formed by a MAXMET composite coating applied by a cold spray process.

The Referring also to FIGS. 3 and 4, in an exemplary embodiment, the composite coating 32 comprises MAX phase solids. In an exemplary embodiment the coating includes MAX phase particles 34. In an exemplary embodiment the MAX phase particles can include ternary carbides or nitrides are defined by the formula $M_{n+1}AX_n$, where n is a number from 1 to 3. M is an early transition metal, A is an A group element, and X is either carbon (C), nitrogen (N) or both. Early transition metals are any element in the d-block of the periodic table, which includes groups 3 to 12 on the periodic table. A-group elements are mostly group IIA or IVA. The metal matrix of the MAXMET composite is at least one of a low, medium, and high melting point metals or metal alloys. Low melting point metals or metal alloys are those approximately in the range of from 100 degrees Centigrade to 300 degrees Centigrade. Medium melting point metals or metal alloys are those approximately in the range of 300 degrees Centigrade to 1000 degrees Centigrade. High melting point metals or metal alloys are those in the range of 1000 degrees Centigrade and greater. MAXMET composites are characterized by excellent mechanical properties and improved toughness, high damage tolerance, high thermal stability and improved erosion resistance.

Examples of suitable MAX phase particles 34 include, but are not limited to: $Ti_2AlC$ and $Ti_3SiC_2$. The atomic layers within the MAX phase particles 34 are layers of hard, strong, high modulus carbide. The atoms are also arranged in layers so that they form very weak crystallographic planes. Thus, both high modulus strong planes and very weak planes are present in MAX phase constituent of the MAXMET composites 34. The MAX phases deform by the formation of incipient and permanent kink bands. The kink bands provide damping capability, making MAX phases 34 capable of withstanding vibrational damping and due to their nanolaminated structure they can also withstand impact damage conditions while the high modulus and high hardness of the carbide layers make MAX phases 34 capable of withstanding fine particle erosion. At the same time, the MAX phases 34 are fully machinable using a sharp cutting point or various machining techniques.

The MAX phase particles 34 can be encapsulated in a metallic shell 36 to form a MAXMET composite feedstock 38 that can be readily used in cold or thermal spray manufacturing. The metallic shell 36 can comprise any variety of materials depending on the end use of the composite 32. In an exemplary embodiment the composite is used as an abradable coating in a gas turbine engine. In an exemplary embodiment, the metallic shell 36 can comprise a Ni shell material for use with Ni-based abradable composite materials. In another exemplary embodiment the metallic shell 36 can comprise an Al shell for use with Al based abradable composite materials. Besides Ni and Al, depending on the applications, other metals, such as Cu, Co, Hf, Cr, and the like, can be applied as a coating layer. In another exemplary embodiment, another metal such as W can be used in the cold spray process in combination with a ductile metal that can trap the W and the hard MAX phase together. This form of coating is a ternary system.

The metallic shell 36 minimizes oxidation of the MAX phase particles 34 during the spray application process. The metallic shell 36 permits more efficient deposition of the MAXMET composite material 38. The ductility of the metal shell improves the deposition. Ductility is important in reaching a fully dense cold sprayed deposit, since the cold spray process relies on plastic deformation of particles. The efficient deposition of the MAXMET composite 38 contributes to improved erosion resistance and abradability.

The metallic shell 36 cladding can be created by a variety of methods. For a given element, for instance, Al, certain procedures may be unique in order to create good bonding to MAX phase. Among these methods are, a) wet chemistry approach via a redox reaction to produce metallic shell from a metallic salt in a solution on the surface of MAX phase particles, b) a combination of wet chemistry and gas reduction to make metallic particles from metal oxides resulted from solution, c) chemical vapor deposition, physical vapor deposition, d) electrochemical reduction, e) agglomeration of fine (<5-10 micron) clad MAX phase particles during the plating process to form multi-particulate MAXMET domains of approximately 16-150 micron size suitable for spray deposition and f) electroless plating via an autocatalytic chemical reaction to produce metal coatings on the MAX phase particles, and g) chemical cladding. The procedure and nickel bath (e.g. nickel chloride+hydrated sodium hypophosphite ($NaPO_2H_2O$) for electroless plating is commercially available and cost-effective. Methods c and d are ideal for fabrication of active metals with very negative electrode potentials, such as Al, Mg, and so on, which may not be able to be achieved with other methods. Other exemplary embodiments include spray dried applications of particles as well as ball milling the powders together, referred to as mechanically alloyed composites.

As described herein, a cold spray technique is utilized to apply the MAXMET composite coating. The method includes either co-spraying of individual constituent feeds, or cold spraying of composite particles in which the MAX phase and metal matrix are already spray dried or bonded via other processes as detailed above.

In cold spray process the coating material is accelerated toward the surface of the substrate to be coated. The cold spray process utilizes a high pressure gas jet, typically helium or nitrogen to accelerate particles to supersonic speed through a convergent-divergent nozzle so that the particles are propelled at sufficient kinetic energy to undergo plastic deformation at impact. The powder or powders forming the coating material are fed along with a carrier gas such as nitrogen and helium, into the cold spray system. The cold spray system includes a spray gun with a nozzle and a pre-chamber coupled to the nozzle.

The cold spray technique does not melt the particles during spraying. The carrier gas temperature can be between 200 degrees Celsius and 800 degrees Celsius. The particles flowing with the carrier gas are not exposed to the gas temperatures long enough to melt. The low temperature of the cold spray process enables the production of coatings with, low porosity, and low oxygen content, while avoiding the detrimental influence of heating the powders which may create melting and/or decomposition of important phases.

The powder particles are fed to a spray gun at a desired feed rate. A carrier gas flow of nitrogen or helium for example, is at a desired feed rate. In an exemplary embodiment the carrier gas feed rate is from about 4 cubic meters per hour to about 12 cubic meters per hour. The carrier gas flow rate is described in standard cubic meters per hour ($m^3/h$). Standard conditions may be described as about room temperature and about one atmosphere of pressure.

The gases that make up the cold spray gas stream include a primary gas (such as nitrogen or helium) and if necessary secondary gases can be implemented.

The process includes translating the spray gun so that the nozzle is positioned at a desired distance from the surface of the substrate to be coated. The substrate to be coated may be passed through the spray of powder particles emanating from the spray gun.

The spray gun to be used to form the coatings disclosed herein may include internal feed and external feed spray guns. Suitable spray guns include the varieties manufactured by CGT/Orelikon, Plasma-Giken, Impact Innovations and the like.

Typical powder carrier gas flow supplying the MAXMET composite powder to a spray gun (either N2 or He) is in the range of 2 to 12 $m^3/h$, with a typical primary gas flow rate in the range of 5 to 250 $m^3/h$ depending on the nozzle geometry. A powder feed rate to the spray gun is dependent on the density of the powder. In an exemplary embodiment, a powder feed rate can be in the range of 1 to 10 grams per minute and up to 20 grams per minute for very dense materials and/or heavy feed-rates. An exemplary embodiment can include a gun distance from a surface of the substrate being coated of from 0.25 to 5 inches. Another exemplary standoff distance can be from 1 to 2 inches.

The cold spray parameters may be adjusted to produce a coating with a desired level of porosity, density, thickness and the like. If desired, one can obtain a coating with a dense structure by varying the particle velocity and standoff distance. In an exemplary embodiment, a critical velocity is obtained. The critical velocity ensures effective deposition of the MAXMET coating. Below the critical velocity, the cold spray coating does not readily build up, precluding effective consolidation of the MAXMET. As the metal serves as the ductile binder for the MAXMET, the spray parameters must be configured such that impact velocity of the metal is at or above this critical velocity. The critical velocity is estimated following the approach of Schmidt et al. (Schmidt et al.; Acta Mater.; 54 (2006) pgs. 729-742) which is incorporated by reference herein. The critical velocity is taken as a function the metal's specific gravity, specific heat, melting point, and ultimate stress as well as the spray temperature and size distribution of the feedstock powder.

In another alternative embodiment, there is also provided a process of forming a MAXMET composite on an article— that could be removed from the MAXMET component by cutting or machining process—in the form of buildup for use as solid components. The solid component formed in this way, can be utilized independently of the article.

The exemplary substrate described herein included an outer case 20, in alternative exemplary embodiments the substrate can include an article that is selected from the group consisting of a dampener, a bushing, an air seal, a combustor component, and an airfoil. The combustor component can include a variety of combustor parts, such as, combustor liners, transition ducts, bulk head segments, fuel nozzles, fuel nozzle guides, and the like.

The advantages of the methods described herein are that the cold spray process minimizes oxidation of the MAX phase particles and/or decomposition of the MAX phase particles during the spray process and permits a more efficient deposition of the MAXMET composite, which in turn contributes to improved erosion resistance and abradability. Cold spraying allows coating formation, additive manufacturing with local deposition, low temperature processing to retain the MAX phase and minimize oxidation of the metal phase. In some cases, it eliminates certain additional processing routes such as spray drying that can significantly increase yield and reduce manufacturing costs. The metal matrix improves sprayability of the MAX phases and improves the damping capability, ductility, strength and toughness of the resultant composites. The method is proven to be highly feasible to cold spray homogeneous coatings of Al-matrix with $Ti_2AlC$ MAX phase particles. Due to the temperature being controlled and selected to be below the melting temperature of the material being sprayed during the cold spray process, no particle melting occurs and composition of initial particles is retained with very little or no oxidation or decomposition of the constituent phases. Thicker parts are enabled, due to the elimination of solidification stresses. The method offers low defect coatings for MAXMET composite materials with high deposition efficiency that can increase yield and reduce cost.

One or more embodiments have been described. Nevertheless, it will be understood that various modifications may be made. For example, the present disclosure seeks to provide a method to apply a MAXMET composite by cold spraying techniques. Accordingly, other embodiments are within the scope of the following claims.

What is claimed is:

1. A process of forming a MAXMET composite coating on an article comprising:
   providing an article having a substrate;
   forming at least one MAX phase particle; and
   coating said at least one MAX phase particle with a metallic shell;
      providing at least one powder containing the MAXMET composite, wherein the MAXMET composite comprises a mixture of said MAX phase particles with the metallic shell and metal;
      cold spraying said at least one powder on said substrate such that a powder velocity is at least a critical velocity required for deposition;

forming a layer of said MAXMET composite on the substrate.

2. The process of claim 1 wherein said cold spraying includes using a carrier gas selected from the group consisting of nitrogen, air and helium.

3. The process of claim 1, wherein said metal comprises at least one of Al, Cu, Co, Ti and Ni.

4. The process of claim 1, wherein said article is selected from the group consisting of a dampener, a bushing, an air seal, a combustor component, and an airfoil.

5. The process of claim 1, further comprising:
a bond coat layer adhered to at least a portion of the substrate;
said MAXMET composite layer adhered to said bond coat.

6. The process of claim 1, wherein said metallic shell comprises Ni.

7. The process of claim 1, wherein said metallic shell comprises Al.

8. The process of claim 1 wherein said MAX phase is defined by the formula $M_{n+1}AX_n$ where n is a number from 1 to 3.

9. The process of claim 1, wherein said critical velocity is a function of the MAXMET composite metal's specific gravity, specific heat, melting point, and ultimate stress as well as a spray temperature and a size distribution of the powder.

10. The process of claim 1, wherein said layer of said MAXMET composite on the substrate has a thickness of from about 15 microns to about 5000 microns.

11. The process of claim 1, wherein said MAXMET composite comprises a volume fraction mixture of from about 25% to about 50% MAX phase particles and from about 25% to about 50% Al.

12. The process of claim 1, wherein said MAXMET composite comprises a volume fraction mixture of 50% MAX phase particles and 50% Al.

13. The process of claim 1, further comprising:
spraying a plurality of layers on said article;
forming a predefined structure from said plurality of layers of said MAXMET composite on said article removable from said article by a removal process, wherein said predefined structure is configured as a solid component.

14. The process of claim 1, wherein said cold spraying further comprises:
supplying the MAXMET composite powder to a spray gun using a helium primary gas flow of from about 5 $m^3/h$ to about 250 $m^3/h$, wherein said powder is fed along with said primary gas flow, a powder feed rate to the spray gun of 1 to 20 grams/min., and a gun distance from a surface of the substrate being coated of from 0.25 to 5.0 inches.

* * * * *